United States Patent
Rajan

(10) Patent No.: US 7,558,215 B2
(45) Date of Patent: Jul. 7, 2009

(54) METHOD FOR OPTIMIZING THE FREQUENCY OF NETWORK TOPOLOGY PARAMETER UPDATES

(75) Inventor: Govinda Nallappa Rajan, Huizen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 945 days.

(21) Appl. No.: 10/948,864

(22) Filed: Sep. 24, 2004

(65) Prior Publication Data
US 2006/0067247 A1   Mar. 30, 2006

(51) Int. Cl.
*H04L 12/28* (2006.01)
(52) U.S. Cl. .................................. 370/254; 370/395.2
(58) Field of Classification Search ................. None
See application file for complete search history.

(56) References Cited

U.S. PATENT DOCUMENTS

| | | | |
|---|---|---|---|
| 4,825,206 A | 4/1989 | Brice, Jr. et al. | |
| 4,827,411 A * | 5/1989 | Arrowood et al. | 707/206 |
| 5,671,357 A | 9/1997 | Humblet et al. | |
| 6,704,320 B1 | 3/2004 | Narvaez et al. | |
| 6,791,948 B1 * | 9/2004 | Desnoyers et al. | 370/254 |
| 7,366,112 B2 * | 4/2008 | Ishibashi | 370/255 |

OTHER PUBLICATIONS

"Ant Colony Optimisation for Virtual-Wavelength-Path Routing and Wavelength Allocation", G. N. Varela and M. C. Sinclair, Proc. Congress on Evolutionary Computation (CEC'99), Washington, DC, USA, Jul. 1999, pp. 1809-1816.

* cited by examiner

*Primary Examiner*—Hassan Kizou
*Assistant Examiner*—Dargaye H Churnet

(57) ABSTRACT

Accuracy of network topology information and efficient usage of available bandwidth when broadcasting topology updates are optimized in accordance with the principles of the present invention by collecting and utilizing locally known network usage information to update the network topology information between regular updates. This information is then used in establishing paths for end user communication through the network. It is further used to determine which network topology information is to be included in a subsequent update broadcast by the node. Additionally, it is used to tune adaptively the frequency with which updates are broadcast by the node.

15 Claims, 3 Drawing Sheets

METHOD FOR OPTIMIZING THE FREQUENCY OF NETWORK TOPOLOGY PARAMETER UPDATES

BACKGROUND OF THE INVENTION

1. Field of the Invention

This invention relates to data networks and, more particularly, to topology parameter broadcasts and advertisements provided in the data networks.

2. Description of the Related Art

Data communication networks involve a collection of nodes and links. The nodes, also known as network elements, provide routing and switching functions, whereas the links provide the transmission facility between neighboring nodes. Nodes typically store information about the network in order to be able to route data efficiently and effectively through the network. The stored information is topological and includes sufficient data to define each link state.

In order to keep the network operating properly as it dynamically changes, it is necessary to update the stored network topology information on some periodic basis. Topology broadcast or advertisement mechanisms have been developed to meet the requirement for topology updates within a network. These mechanisms are generally either timer driven or event driven. Topology broadcast, when triggered in each node by the timer or by occurrence of the particular event, is realized by the transmission of network topology information from each node to the nodes in the remainder of the network. Networks that rely on timer driven topology updates can be storing faulty topology information when the network is dynamic and rapidly changing.

While it is important to insure that the network topology information is accurate and up to date, it is also important to avoid flooding the network and consuming the available link bandwidth with these update messages. A tradeoff must be made between accuracy of the stored network topology information at the network nodes and efficient bandwidth usage in the network. Frequent topology parameter updates will insure accuracy and simultaneously devour bandwidth. Infrequent updates preserve the available bandwidth while allowing the network information stored in the nodes to become stale and outdated, thereby increasing the potential for making incorrect routing decisions.

In U.S Pat. No. 5,671,357, an additional timer is used to suppress successive event driven topology broadcasts occurring within a predetermined time interval measured from an initial event occurrence. This technique preserves available link bandwidth by suppressing repeated event driven update messages. In U.S. Pat. No. 4,825,206, a status message, such as a route failure message, is fed back to nodes along the route and causes those nodes to update their network topology databases indicating that the route is inoperative. This technique reduces the number of subsequent status messages generated by the network.

In spite of the attempts to improve the accuracy of the stored network topology information and to improve the efficiency of available bandwidth utilization when updating network topology information, the presently known techniques do not optimize the accuracy or the broadcast efficiency of stored network topology information between broadcast or advertised updates.

SUMMARY OF THE INVENTION

Accuracy of network topology information and efficient usage of available bandwidth when broadcasting topology updates are optimized in accordance with the principles of the present invention by collecting and utilizing locally known network information to update the network topology information between regular updates.

In one embodiment, each node monitors a change or rate of change for each node/link characteristic being observed. The observed characteristic changes are classified in one of at least two groups such as high, medium and low. Based on the classification, certain characteristics are either included or excluded from a subsequent network topology information update to be transmitted by the monitoring node. Additionally, the frequency with which updates are transmitted by a monitoring node is tuned to be directly related to the rate or amount of change in observed link and node characteristics. Also, based on observed characteristics, a certain group of nodes may be selected to receive specific updates of the network topology information.

In another embodiment of the method, network topology information is extracted from a received path set-up request and is used to update locally the network topology information maintained in the node. Subsequently received network topology information updates are then compared to the locally updated network topology information in order to generate a reliability factor for characteristics of each node and link maintained in the topology information set. The reliability factor is then utilized in establishing network paths being requested. Moreover, a node may request an update or more frequent updates from the node or nodes whose associated topology characteristics have a reliability factor less than a desired amount.

BRIEF DESCRIPTION OF THE DRAWINGS

A more complete understanding of the invention may be obtained by reading the following description of specific illustrative embodiments of the invention in conjunction with the appended drawings in which.

It is to be noted, however, that the appended drawings illustrate only typical embodiments of this invention and are therefore not to be considered limiting of its scope because the invention may admit to other equally effective embodiments.

DETAILED DESCRIPTION

Figure 1:
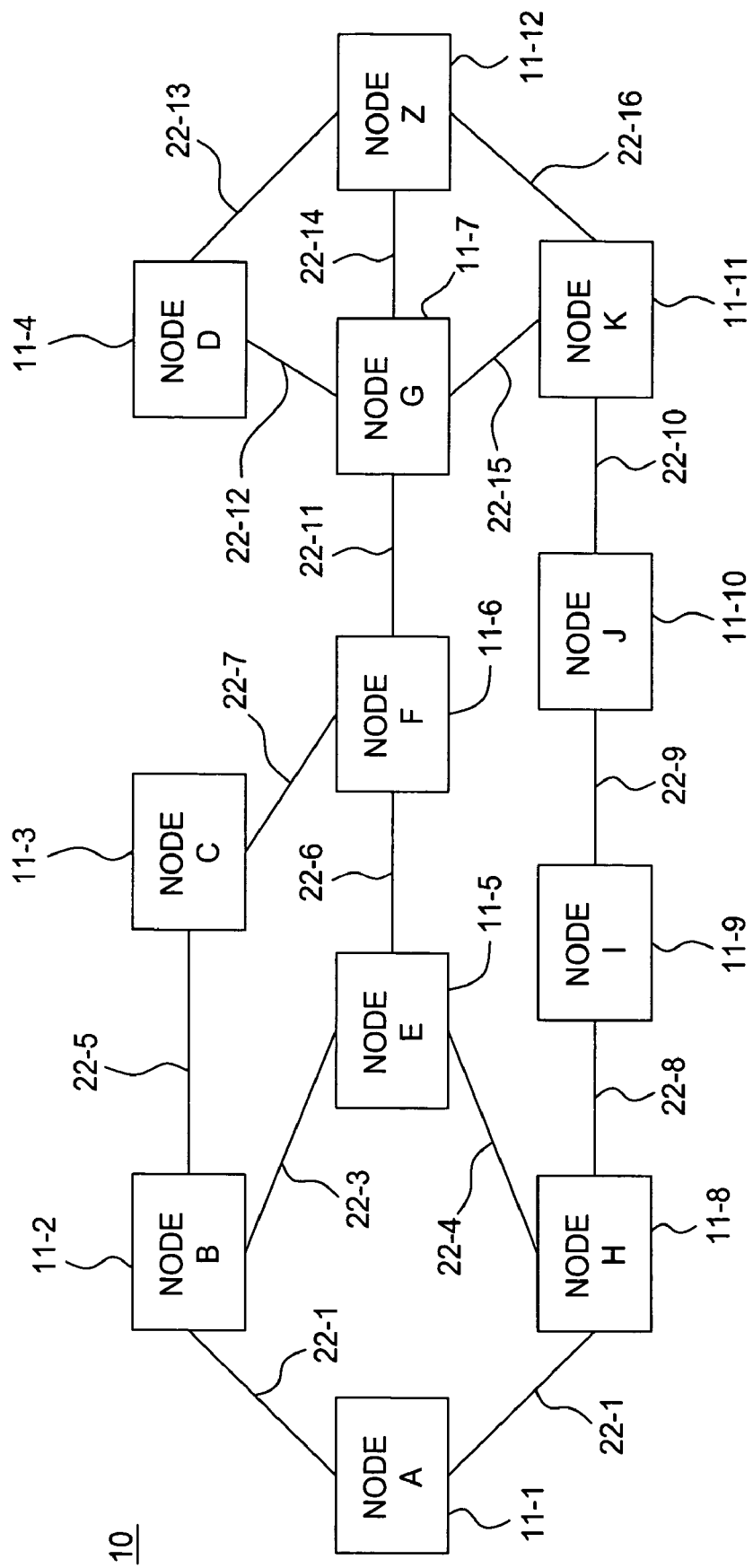
FIG. 1 depicts a simplified data network.

FIG. 1 shows an exemplary data communication network in which a plurality of network elements or nodes 11 are interconnected to each other by links 22. The terms "network element" and "node" will be used interchangeably in this description. The nodes are standard data communication devices such as switches, routers, and the like, whereas the links are transmission media such as wire, cable, optical fiber and even wireless air links. Each node includes a storage element in which routing tables, connection tables, and other network topology information is stored. End users are connected directly or indirectly to the nodes. The end users are not shown in the drawings.

Exemplary network 10 shown in FIG. 1 includes nodes 11-1 through 11-12 and links 22-1 through 22-16. The nodes are alternatively labeled as nodes A-K and node Z. This latter nomenclature will be used in the remainder of the description.

Routing paths through the network are established in response to requests that are propagated through the network.

Protocols such as Open Shortest Path First (OSPF), Intermediate System to Intermediate System (IS-IS), Multi-Protocol Label Switching (MPLS), Generalized Multi-Protocol Label Switching (GMPLS), and the like can be employed to distribute the information for the network topology database, which is used by the network elements to calculate and set up end-to-end paths through the network. When an end user connected to node A wishes to communicate with a user connected to node Z, a path is set up through the network. One path called P, can traverse nodes A, B, E, F, G, and Z. When a user at node H wishes to communicate with a user at node K, a path called $P_2$ can be set up through nodes H, E, F, G, and K. When a user at node C wishes to communicate with a user at node D, a path called $P_3$ can be set up through nodes C, F, G, and D. Reference will be made to these paths in the description below.

A network topology database is associated with each node in a data communication network 10. Each database stores one or more tables of network topology information including the identity of each node and link in the network. Information stored about nodes and links in the network includes parameters such as connectivity, status, and additional parameters such as bandwidth, reliability, congestion, and the like. Specific parameters can include bandwidth availability, bandwidth usage, node congestion, dropped transmissions, transmission delay, and bit error rate. All or at least some of this information is used for dynamically computing a route for data packets to traverse the network during a specific communication session between two end users. Once the session is ended and no other sessions using that route are active, the route is terminated, usage of all nodes and links on the route is relinquished, and the routing table entry corresponding to the route is erased. With reference to the network topology information, the terms "characteristic" and "parameter" are used interchangeably.

It is important for the topology database to maintain the most current information. Current information, if accurate, identifies the nodes and links available in a network for route selection when route requests are made by the end users. If the database information is outdated or faulty, then routing algorithms may attempt to create a route that is actually unavailable because one or more of the links or nodes is full or out of service or the like. Several attempts may be required before an available route is actually determined and established. This wastes network resources unnecessarily.

As described above, topology update broadcasts or advertisements to all the network nodes have been used in the past to insure that the topology databases are periodically updated and corrected. But correctness of this information lasts after the update is completed and broadcast only until the next route is established or relinquished. The present invention seeks to remedy that problem by utilizing locally known network changes to update the topology information after an update has been received by the nodes.

Figure 2:
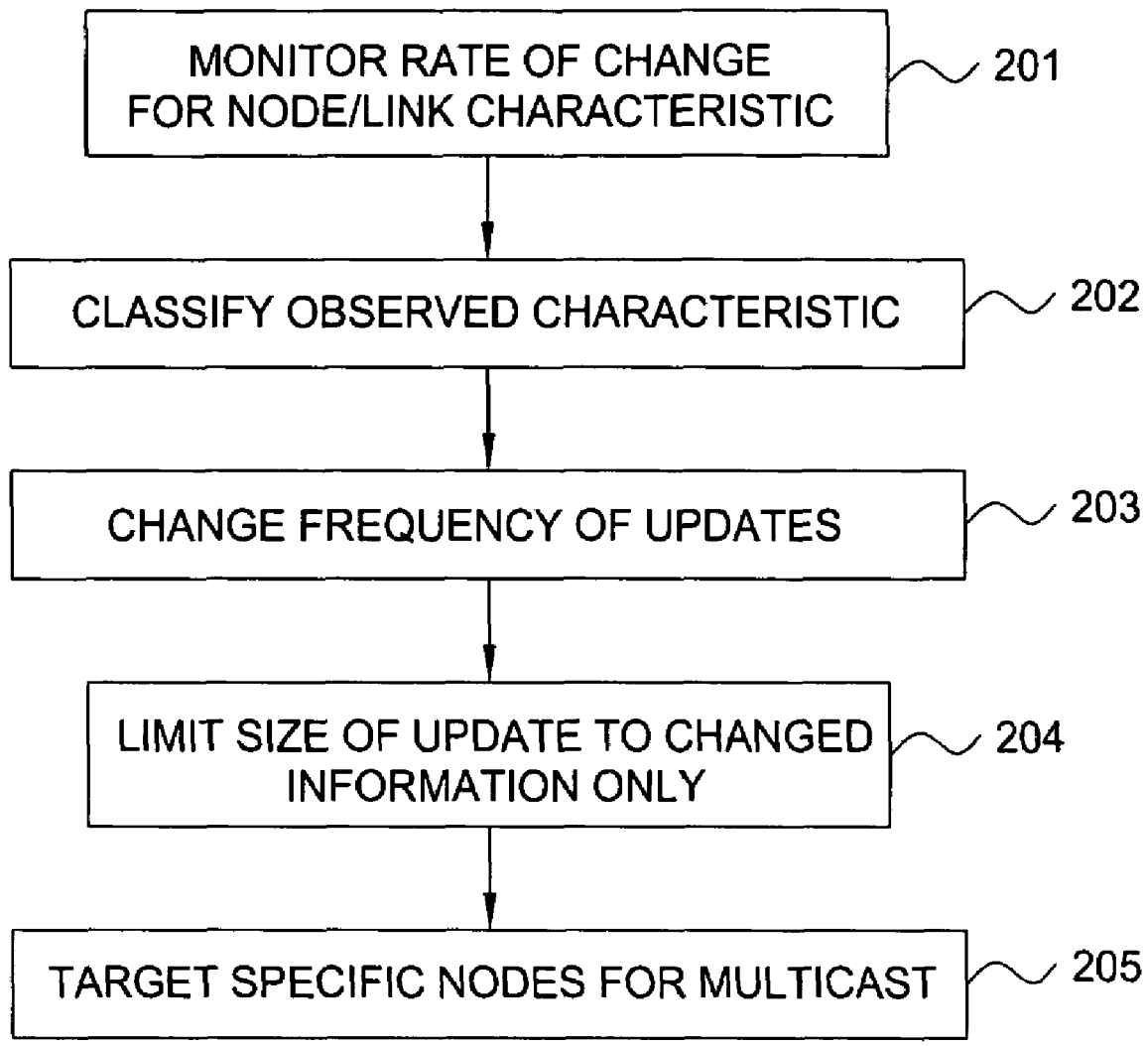
FIGS. 2 and 3 show flowcharts of a process for optimizing the frequency of network topology updates in accordance with the principles of the present invention.

Certain nodes and links are more dynamic than other nodes and links in terms of changing flow paths, changing bandwidth usage, changing congestion, and the like. According to one aspect of the present invention, it is now possible to tune the topology update messages to reflect this dynamic nature of the network by updating via broadcasts only the information related to the subset of nodes and links that exhibit the increased dynamic nature. In this way, the network element learns and adapts the update cycles and minimizes the amount of topology data being exchanged between the nodes, thereby conserving bandwidth usage. The frequency of the updates about certain nodes can be proportional to the frequency of change for the characteristic(s) of that node. That is, frequently changing characteristics can result in an increase of the frequency of updates and less frequently changing characteristics can result in a commensurate reduction of the frequency of updates. Moreover, content of each update may be adapted to avoid inclusion of information about the less frequently changing characteristics with a certain regularity so that the bandwidth demand of topology updates is somewhat reduced. For example, content of each update may therefore include a first group of characteristics more frequently than a second group of characteristics, where the first group experiences change on a more frequent basis than the second group of characteristics. One method for realizing this is shown in FIG. 2.

In step 201, the network element monitors one or more node/link characteristics or parameters. The characteristics include, but are not limited to, available bandwidth, reliability of the node or link, congestion in the node, link delay, bit error events on a given link within a certain time period, number of dropped packets in a node or over certain links and the like. For certain characteristics, it is desirable to monitor the actual value of the characteristic while with others it may be desirable to monitor the rate of change of the characteristic and with still others it may be desirable to monitor the relative change of the characteristic. Node E, for example, can monitor the rate of change of characteristics on the links between nodes B and E (link 22-3), nodes H and E (link 22-4), and nodes E and F (link 22-6) because those links are connected directly to Node E.

Each observed change or rate of change is then classified in step 202 into one of a number of categories or groups. Classification can be performed by the programs within the network element using standard rule-based logic, fuzzy logic, neural networks, or other forms of artificial intelligence. For a particular characteristic, the change or rate of change is classified into one of a number of categories. The number of categories should be at least two but preferably more. For example, if the parameter being measured is bandwidth usage on a link, then it may be useful to classify the bandwidth usage for the link into one of five different exemplary categories, namely, very heavy use, heavy use, normal use, low use, and very low use. In one embodiment, it is contemplated that these classification groups can be determined by a comparison with set thresholds or by using more subjective standards via fuzzy logic. A 10% increase in bandwidth usage for a certain link may result in a determination of heavy usage whereas the same increase for a different link may result in a determination of normal usage. The classification for the particular characteristic can then be stored, if necessary, with the associated link or node topology information.

In step 203, the frequency of distributing updates is then adapted for individual nodes based on the changes seen for the nodes and their associated links. For example, if the bandwidth usage on one or more of the links associated with Node E is deemed to be very high usage, then the topology information distribution would be performed more frequently to Node E. Alternatively, topology information about a node or link having rapidly changing characteristic(s) may be distributed more frequently than topology information about a node or link whose characteristic is subject to a lesser degree of change. It should be understood that a node or link that experiences a high degree of change in its characteristic(s) will also have a network topology database that is potentially more up-to-date than other nodes in the network. Thus, the frequent transmission of topology updates both to that node and about that node is contemplated by the present method.

In step 204, the network element limits the amount of information to be distributed based on the classification groups determined in step 202. In order for information about the characteristic based on the observed change or rate of change, it is contemplated that the change or rate of change be measured against a prescribed threshold. If the change or rate of change meets or exceeds the threshold, then the related characteristic is included in the subsequent topology update. If the change or rate of change falls below the prescribed threshold, then the related characteristic is excluded from the subsequent update. That is, an update of network topology information will contain only the topology information related to the characteristics of nodes and links that are changing appreciably and/or rapidly in one exemplary embodiment. For example, if the bit error rate characteristic on a particular link changes less rapidly than the bandwidth usage for that link, network topology updates broadcast about that link may not include the bit error rate characteristic information as frequently as the bandwidth usage information. This adaptation of the content and size of an update based on the observed change (or rate of change) for a characteristic of a node or a link thereby reduces the amount of information transmitted over the network. As a result, bandwidth is conserved.

In step 205, the network element targets a subset of specific nodes in the network for receiving the distribution of the network topology update. The network element determines this subset of nodes based upon the characteristics observed and classified into groups earlier in the method. Based on this determination, the network topology information is subsequently transmitted by the node over the network to the subset of nodes. It is contemplated that, based on the information stored in its database, a node may override a timer-driven update because the information has undergone little or no substantial change.

Figure 3:
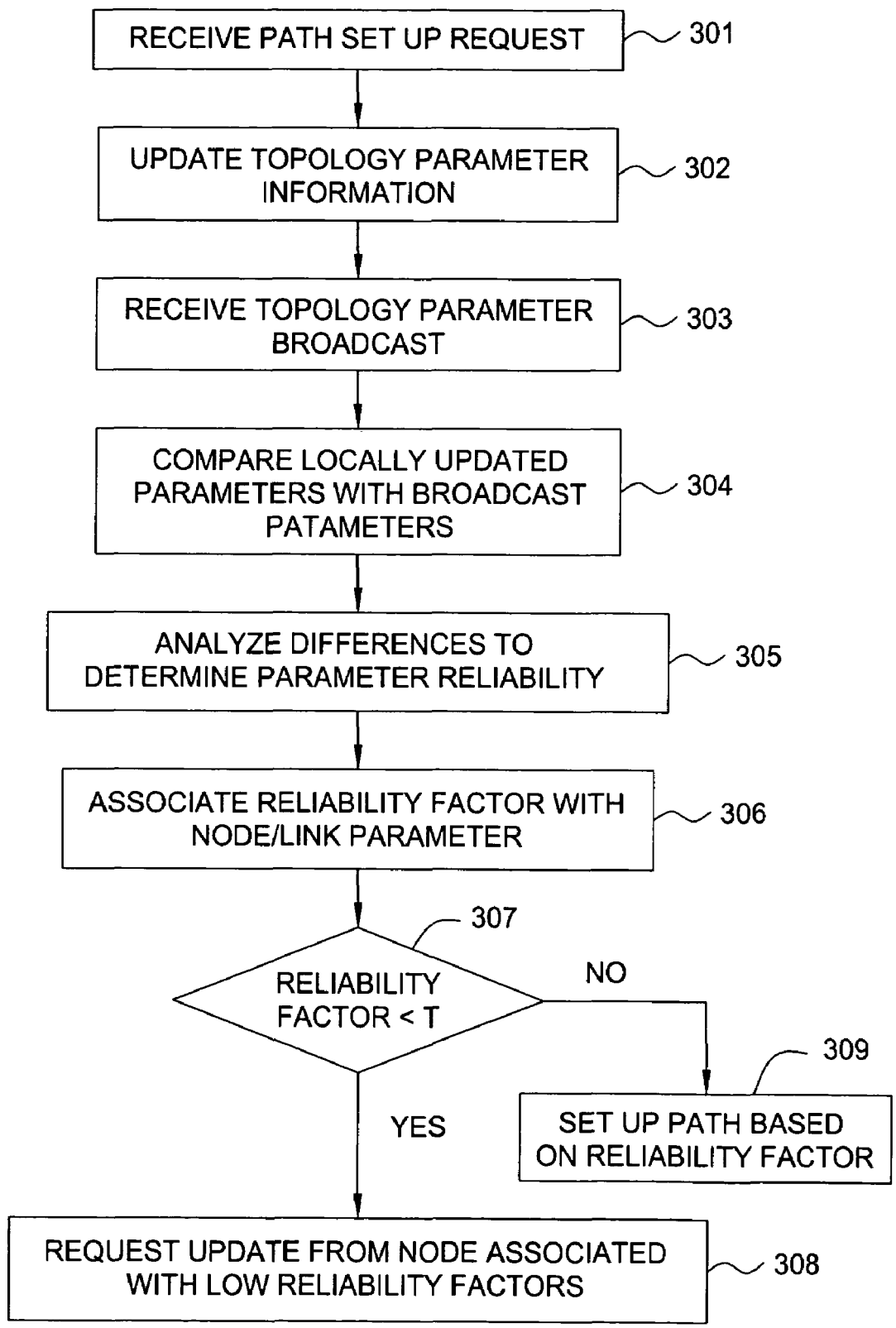

In between updates from other nodes and in accordance with the principles of the present invention and as shown in the method depicted in FIG. 3, each node can derive locally the values of individual parameters of other nodes and links by processing information about network paths or routes that pass through the node. For example, suppose that Node E has received an update to the network topology database from the network manager. Subsequently, path set-up requests are received by Node E to establish paths $P_1$, $P_2$, and $P_3$. When path $P_1$ is set up, Node E can update its topology database of available bandwidth to account for the usage of links AB (link 22-1), BE (link 22-3), EF (link 22-6), FG (link 22-11), and GZ (link 22-14). Similarly, when path $P_2$ is set up, Node E can update its topology database of available bandwidth to account for the added usage of links HE (link 22-4), EF (link 22-6), FG (link 22-11), and GK (link 22-15). In this manner, the network topology database at any node can be updated locally and independently from receiving any updates from other nodes or the network manager.

But this procedure may not be completely accurate. Unless all path set-up requests pass through every node in the network, then it is unlikely that a node will account for those changes to nodes and links on a route whose set-up request does not pass through that particular node. For example, it is unlikely that nodes C, D, H, I, J, and K can independently account for the bandwidth usage resulting from path $P_1$ without some input from a node on path $P_1$ during the next broadcast network topology information update.

The risk associated with the inaccuracy described above can be ameliorated by analyzing at each node the differences between the actual parameters and the locally calculated parameters and by developing trend information. The differences can be calculated when an update is received from another node or from the network manager. In one example, let it be assumed that only 10% of the paths associated with node C are also associated with Node E. This means that 90% of the paths that are associated with Node C will not be observable by Node E. Thus, it is quite probable that calculation of parameters performed locally by Node E in relation to node C will not reflect the true condition for node C's parameters. When Node E receives the update of parameters from or about node C and then compares the actual parameters as received in the update to the locally generated estimate of those parameters, a difference should be observed. In light of this difference, it is then possible to determine the reliability of the locally generated estimates. Also, by maintaining a compilation of the differences over a time period even by using time-stamped difference calculations, it is then possible to perform a trend analysis using simple techniques or more complex statistical techniques in order to provide some measure of predictability in the differences. Moreover, such a trend analysis can be utilized in setting a reliability factor for each characteristic parameter computed locally by a node. In the example above, parameters calculated by Node E for node C would be considered generally unreliable unless the trend was utilized in an adaptively controlled prediction or estimation technique to minimize the difference ideally to zero over time. Of course, the latter technique would also have the concomitant effect of improving the reliability factors over time.

While a trend analysis is optional for the present method, it is a desirable feature of this invention. In order to understand the usefulness of trend analysis, initially suppose that the differences between estimated (locally calculated) and actual (received in a topology update) parameter values for changing parameters remain constant over a time. After a current network topology information update is received by a node, the value of the parameter is calculated and estimated by using the route set-up request, for example. It is then possible to correct the estimated value of this parameter by using the difference value calculated when the update was received. If difference values are substantially static over time as assumed above, then the corrected estimation will be a good approximation of the actual parameter value. On the other hand, if the difference values vary substantially with time, then any correction to the estimated parameter value will be suspect and may even be substantially different from the actual parameter value. Trend analysis can then be used to predict the future values of a parameter based on the past performance of that parameter. In this case, the trend analysis can be used to track the differences and thereby predict a more appropriate value for use in correcting parameter estimates. If the appropriate trend over time (e.g., linear, polynomial, etc.) is used to make corrections, then the estimated parameter can be expected to be more representative of the actual value of the parameter.

As discussed above, the trend analysis can be used to determine a reliability factor for each parameter. Reliability factors can be classified into separate groups as high, low and medium, for example. Other groupings are contemplated. In an exemplary embodiment, reliability is classified as high when the difference of differences in a time period is less than or equal to 25% of actual value for a parameter as determined by a subsequent update received in a topology update for that parameter; reliability is classified as low when the difference of differences in a time period is greater than or equal to 75% of the actual value; and reliability is classified as medium when the difference of differences in a time period is between 25% and 75% of actual value.

When reliability factors are assigned to the calculated characteristic parameters, these factors can be used by the nodes to assist in a path set-up when a request is received. According to an exemplary service level agreement for the data network, any node establishing a path in response to a request can only use nodes and links that have a high reliability factor associated therewith. As a result, nodes and links with lower reliability factors will be avoided in setting up a path.

In a similar manner, the reliability factors can be used to trigger a node to request updates from those nodes whose node and/or link parameters have a low reliability associated with them. Alternatively, the frequency of updates from nodes whose associated reliability factors are low can be increased so that the receiving nodes have more highly reliable parameters stored in the topology database.

FIG. 3 shows a flowchart of a method in accordance with the principles of the present invention wherein each node locally updates the network topology database information based on information passing through that node. This method has been described generally in the several preceding paragraphs.

In step 301, a node called the local node below receives a path set-up request. Based on the nodes and links required for establishing the path, the local node can calculate and update the bandwidth usage or available bandwidth parameters stored in the network topology information database for the nodes and links associated with the requested path as shown in step 302.

In step 303, the local node receives an update from another node or from the network manager for the network topology information database. In step 304, the locally updated parameters updated in step 302 are compared to the new parameters received in step 303. The differences are also stored in a separate database. In one embodiment from experimental practice, the differences from a particular comparison are time-stamped for future reference and for use in a trend analysis.

In step 305, the differences are analyzed to determine a reliability factor for each parameter. If the differences are great, the reliability factor is determined to be low, whereas, if the differences are small, the reliability factor for the parameters will be determined to be comparatively high.

In step 306, the reliability factors are then associated with and stored with the updated parameters for each node and link. In step 307, if the reliability factor for a parameter is determined to be unacceptable by, for example, a comparison between it and a threshold value T, then the local node requests an update from the node whose node parameters or associated link parameters are believed to be unreliable by the local node. In addition or alternatively, the local node can request the node whose parameters are unreliable to broadcast updates containing that data on a more frequent basis.

In step 309, the path is set up based on the request and the reliability factors stored in the updated network topology database.

Although the description above has been given in terms of change or rate of change for a particular characteristic or parameter, it will be appreciated by persons skilled in the art that the method is adaptable to any and all types of change that can be monitored directly and indirectly and classified for the characteristics. The types of change contemplated herein include, but are not limited to, absolute change where a parameter value has changed to a new number, relative change where the value has changed by a certain percentage or by an amount relative to some predetermined amount, and rate of change where the value is changed by an amount over the measurement period.

While the foregoing is directed to embodiments of the present invention, other and further embodiments of the invention may be devised without departing from the basic scope thereof, and the scope thereof is determined by the claims that follow. For example, the method shown in FIG. 3 can also be modified to be used with the Bit Error Rate parameter and the transmission delay parameter on the links. When routes are requested, the assignment of the routes can be conditioned both upon shortest routes and upon the bit error rate or the transmission delay of the links being below certain values. In this case, the topology database would contain the bandwidth available on the links together with the bit error rate on each link and the transmission delay on each link.

The invention claimed is:

1. In a data communication network comprising a plurality of nodes interconnected by links to form communications paths between said nodes, each node capable of transmitting and storing network topology information at least about itself to one or more nodes in said network, a method comprising the steps of:

receiving a path set-up request identifying nodes and links assigned to a communication path being established in the network;

updating network topology information within the node in response to the path set-up request to generate a locally updated set of said network topology information reflecting link and node characteristic changes caused within the network by the path set-up request;

receiving a globally updated set of said network topology information;

comparing said globally updated set to said locally updated set in order to generate a difference set of network topology information; and analyzing said difference set in order to assign a reliability factor for characteristics of each node and each link in said network topology information, the reliability factor being indicative of the difference between said globally updated set and said locally updated set.

2. The method as defined in claim 1 further including the step of storing each reliability factor with its associated node and link in the set of network topology information.

3. The method as defined in claim 2 further including the step of establishing a path through the network in response to a path set-up request utilizing only links and nodes having predetermined topology characteristics whose associated reliability factors that are indicative of substantially high reliability.

4. In a data communication network comprising a plurality of nodes interconnected by links to form communications paths between said nodes, each node capable of transmitting and storing network topology information at least about itself to one or more nodes in said network, a method comprising the steps of:

receiving a path set-up request identifying nodes and links assigned to a communication path being established in the network;

updating network topology information within the node in response to the path set-up request to generate a locally updated set of said network topology information reflecting link and node characteristic changes caused within the network by the path set-up request;

receiving a globally updated set of said network topology information; and comparing said globally updated set to said locally updated set in order to generate a reliability factor for characteristics of each node and each link in the set of said network topology information, the reliability factor being indicative of the difference between said globally updated set and said locally updated set.

5. The method as defined in claim 4 further including the step of storing each reliability factor with its associated node and link in the set of network topology information.

6. The method as defined in claim 5 further including the step of establishing a path through the network in response to a path set-up request utilizing only links and nodes having associated reliability factors are indicative of high reliability.

7. The method as defined in claim 1 further including the step of requesting network topology information from a selected node having at least one characteristic that has an associated reliability factor indicative of substantially low reliability.

8. The method as defined in claim 7 wherein said requesting step includes requesting frequency updates of said network topology information from the selected node.

9. The method as defined in claim 1 further including the steps of:
   applying a time-stamp to said difference set; and
   storing said difference set.

10. The method as defined in claim 9 wherein the step of analyzing further includes analyzing said difference set stored therein in order to assign the reliability factor.

11. In a data communication network comprising a plurality of nodes interconnected by links to form communications paths between said nodes, each node capable of transmitting and storing network topology information at least about itself to one or more nodes in said network, a method comprising the steps of:
   receiving a path set-up request identifying nodes and links assigned to a communication path being established in the network;
   updating network topology information within the node in response to the path set-up request to generate a locally updated set of said network topology information reflecting link and node characteristic changes caused within the network by the path set-up request:
   monitoring a change for a characteristic of a node;
   classifying said node characteristic into one of at least two groups, each group representing a substantially similar node characteristic change observed in said monitoring step, one group representing a substantially different change from other groups in the at least two groups; and
   transmitting the network topology information to said nodes more frequently when the node characteristic is classified into the first group than when the node characteristic is classified in the second group.

12. The method as defined in claim 11 further including the step of eliminating a selected node characteristic from the network topology information being transmitted when said selected node characteristic is classified in the second group.

13. The method as defined in claim 11 further including the step of including a selected node characteristic in the network topology information being transmitted when said selected node characteristic changes by at least a prescribed amount.

14. The method as defined in claim 11 further including the step of including a selected node characteristic in the network topology information being transmitted when said selected node characteristic changes at a rate greater than or equal to a prescribed rate.

15. The method as defined in claim 11 further including the steps of:
   including a selected node characteristic in the network topology information being transmitted when said selected node characteristic changes at a rate greater than or equal to a prescribed rate;
   eliminating a selected node characteristic from the network topology information being transmitted when said selected node characteristic is classified in the second group; and
   targeting a subset of nodes to receive updated network topology information based on the group to which the characteristics of each node and link associated therewith are assigned;
   and wherein said nodes in the transmitting is the subset of nodes targeted.

* * * * *